March 22, 1927.  G. A. H. KELLNER  1,621,741

PROJECTING SYSTEM FOR CINEMATOGRAPHS

Filed Aug. 20, 1924

INVENTOR.
Gustav A. H. Kellner
BY Frederick F. Church
his ATTORNEY

Patented Mar. 22, 1927.

1,621,741

UNITED STATES PATENT OFFICE.

GUSTAV A. H. KELLNER, OF ROCHESTER, NEW YORK, ASSIGNOR TO BAUSCH & LOMB OPTICAL COMPANY, OF ROCHESTER, NEW YORK, A CORPORATION OF NEW YORK.

PROJECTING SYSTEM FOR CINEMATOGRAPHS.

Application filed August 20, 1924. Serial No. 733,137.

In lighting systems for cinematographs, where intensity of illumination is required, it is now customary to employ what are known as high intensity arc lamps in which the crater in the carbon that is imaged on the aperture plate is relatively small but the heat generated is enormous and this precludes the arc being located in close proximity to the condensing system by reason of possible damage to the latter. At the same time it is desirable that the heat rays projected on the aperture plate of the motion picture projection apparatus be reduced in area to as nearly as possible the size of the aperture to prevent undue heating.

My invention therefore has for its object to provide a lighting system so constructed that not only may the source of light, say a high intensity arc lamp, be located at a safe distance from the condenser but that although the rays from the arc to the margin of the condenser form a small angle with the optical axis the maximum illumination will be obtained without undue heating.

These objects are obtained by not only providing a relaying lens system between the lamp and the aperture plate but by making the condenser adjacent to the lamp of a combination of lenses, one at least of which has a parabolic surface and this parabolic surface is located on the side away from the lamp or in the direction of the projection.

Figure 1:
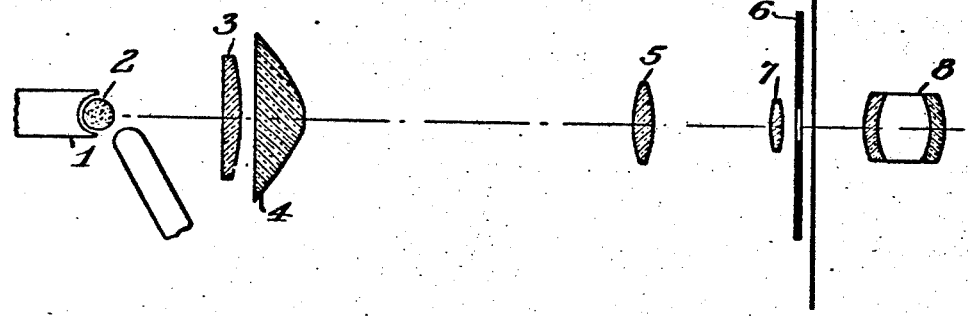
Figure 2:
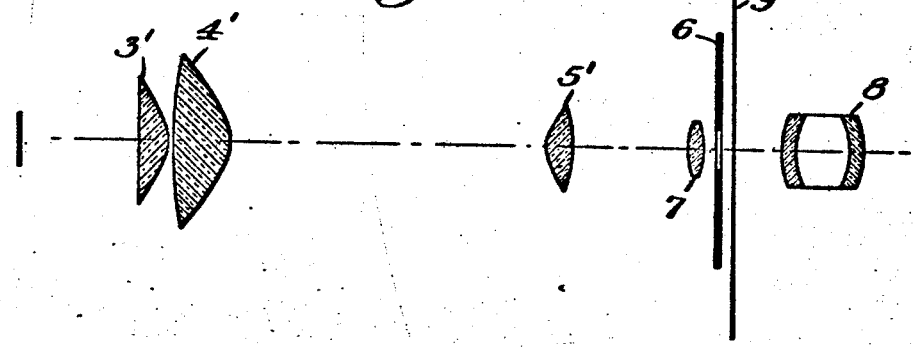

In the accompanying drawings I have shown diagrammatically two forms of the invention:

Figure 1 represents the form adapted particularly for the high intensity arc lamp as the illuminant, and Figure 2 is a form well adapted for an incandescent lamp having a plurality of strands covering a considerable area and termed a monoplane filament.

Similar reference numerals throughout the several views indicate the same parts.

Returning to the system shown in Figure 1, the numeral 1 indicates the positive carbon of a high intensity arc lamp, having a relatively deep crater 2 which contains a so-called "gas ball," and therefore the illuminating rays are projected laterally at a relatively small angle. Located in front of this illuminant is a condensing system composed of a plano convex spherical lens 3 and beyond this a positive lens 4 having its emergence surface parabolic, the curves of the surfaces being so co-ordinated that the aberrations of the component 3 are compensated for by the parabolic surface so that the image of the gas ball and its surrounding rim are perfectly centered and focused upon a collective lens 5. The proper imaging upon the lens 5 is important because in these high intensity lamps the gas ball at the center of the crater in the positive carbon is bluish white and the rim of the crater reddish and unless they occupy the proper position the image projected by lens 5 on the aperture plate 6 will not be of even illumination or color. It is extremely important that the rays from the whole be intercepted by the lens because unless this is done the color of the illuminated screen area will not be white and the lens 5 may have to be of objectionable size. This is most successfully accomplished by the use of a parabolic surface on the lens 4. Another collective lens 7 is placed in the front of aperture 6 to reimage the image of the light source in the lens 5 into the projection lens 8, from which the images of the aperture plate or the film 9 are projected on the screen.

In the form shown in Figure 2 the light source is a monoplane filament incandescent lamp and in this, the rays from the light source to the margin of the condenser may form a wide angle. Therefore both the components 3' and 4' of this combination near the light source are formed with their emergent surfaces parabolic. In this instance also the curves are co-ordinated to produce a centered image of minimum lateral spread upon a collective lens 5' for if this was not done there would be loss of light and uneven illumination and color fringes on the screen, but this is avoided by the proper use of parabolic surfaces in the lenses 3' and 4'. In this arrangement the collective lens 5' has a parabolic and a spherical surface, the former preferably facing the condenser.

The aperture plate 6, the lens 7 and the projection lens 8 in this figure have the same functions as in the form previously described.

In the form shown in Figure 1 as only one of the components of the condensing system need have a parabolic surface, and as the cost of lenses of this type is great, I place the lens 3 having a spherical surface next the lamp so that in the event of breakage the cost of replacement will be small and also this lens serves to protect the expensive lens 4.

I claim as my invention:

1. In a projecting system for cinematographs, the combination with a source of illumination, a condenser next to said source having at one of its components a parabolic lens, a collective lens located to receive within it the projected image of the source, a second collective lens so located between the last mentioned lens and the aperture plate that the section of the illuminated cone at the aperture plate is evenly illuminated and an image of the light source is transmitted to the projection lens, and a projection lens.

2. In a projecting system for cinematographs, the combination with a source of illumination, a condenser next to said source embodying two components each of which has at least one parabolic surface, a collective lens located to receive within it the projected image of the source, one of the surfaces of said lens being parabolic, a second collective lens so located between the last mentioned lens and the aperture plate that the section of the illuminated cone at the aperture plate is evenly illuminated and an image of the light source is transmitted to the projection lens, and a projection lens.

3. In a projecting system for cinematographs and the like, a source of illumination, an aperture plate, and a relaying lens system between the said source and said plate including a multi-lens condenser adjacent the illumination source and having a parabolic lens as one of its component lenses.

4. In a projecting system for cinematographs and the like, a source of illumination, an aperture plate, and a relaying lens system between the said source and said plate including a multi-lens condenser adjacent the illumination source and having a parabolic lens as one of its component lenses, the paraboloid surface of said parabolic lens being provided upon the face of that lens away from the source of illumination.

5. In a projecting system for cinematographs and the like, a source of illumination, an aperture plate, and a relaying lens system between the said illumination source and said plate, said system including a multi-lens condenser adjacent said source, the component lens of said condenser furthest from said source, having a paraboloid surface, whereby it will be protected from the heat of said source by the other component condenser lens.

6. In a projecting system for cinematographs and the like, a source of illumination, an aperture plate, and a relaying lens system between the said illumination source and said plate, said system including a multi-lens condenser adjacent said source, the component lens of said condenser furthest from said source having a paraboloid surface, whereby it will be protected from the heat of said source by the other component condenser lens, said condenser lens with said paraboloid surface being mounted with said surface on the light emergent side.

7. In a projecting system for cinematographs and the like, a source of illumination, an aperture plate, and a relaying lens system between said source and said plate, said system including a condenser adjacent the said source, and a pair of collective lenses between the condenser and said plate, one of said collective lenses having a paraboloid surface.

8. In a projecting system for cinematographs and the like, a source of illumination, an aperture plate, and a relaying lens system between said source and said plate, said system including a condenser adjacent the said source, and a pair of collective lenses between the condenser and said plate, one of said collective lenses having a paraboloid surface facing the condenser.

9. In a projecting system for cinematographs and the like, a source of illumination, an aperture plate, and a relaying lens system between said source and plate, including a multi-lens condenser adjacent said source, and a collective lens system between said condenser and said plate; one of the component lenses of both condenser and collective system having a paraboloid surface.

10. In a projecting system for cinematographs and the like, a source of illumination, an aperture plate, and a relaying lens system between said source and plate including a multi-lens condenser adjacent said source, and a collective lens system between said condenser and said plate; one of the component lenses of both condenser and collective system having a paraboloid surface, the lenses with the paraboloid surfaces being mounted with their paraboloid surfaces facing one another.

11. In a projecting system for cinematographs and the like, a monoplane filament source of illumination, an aperture plate, and a relaying lens system between said source and plate, including a multi-lens condenser adjacent said source, a plurality of the component condenser lenses having paraboloid surfaces upon at least one face of each, and a collective lens between said condenser and plate.

12. In a projecting system for cinematographs and the like, a monoplane filament source of illumination, an aperture plate, and a relaying lens system between said source and plate, including a multi-lens condenser adjacent said source, a plurality of the component condenser lenses having paraboloid surfaces upon at least one face of each, said condenser lenses being mounted with their paraboloid surfaces upon the light emergent faces thereof.

GUSTAV A. H. KELLNER.